US008467530B2

(12) United States Patent
Suleiman et al.

(10) Patent No.: US 8,467,530 B2
(45) Date of Patent: Jun. 18, 2013

(54) SYSTEM AND METHOD FOR ENCRYPTING AND DECRYPTING DOCUMENT REPRODUCTIONS

(75) Inventors: Mohammad A. Suleiman, Trabuco Canyon, CA (US); Hongfeng Wei, Amaheim, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1796 days.

(21) Appl. No.: 11/243,858

(22) Filed: Oct. 5, 2005

(65) Prior Publication Data

US 2007/0076874 A1    Apr. 5, 2007

(51) Int. Cl.
*H04L 29/06* (2006.01)

(52) U.S. Cl.
USPC ......................................... 380/243

(58) Field of Classification Search
USPC ......................................... 380/243
See application file for complete search history.

(56) References Cited

U.S. PATENT DOCUMENTS

| 4,957,689 | A  | * | 9/1990 | Ohnishi et al. | 358/296 |
|---|---|---|---|---|---|
| 5,321,749 | A  | * | 6/1994 | Virga | 380/243 |
| 5,486,686 | A  | * | 1/1996 | Zdybel et al. | 235/375 |
| 5,491,563 | A  |   | 2/1996 | Pomerantz | |
| 5,642,199 | A  |   | 6/1997 | Ukai et al. | |
| 6,839,844 | B1 |   | 1/2005 | Okano | |
| 2002/0099947 | A1 | * | 7/2002 | Evans | 713/193 |
| 2002/0108035 | A1 | * | 8/2002 | Herley et al. | 713/165 |
| 2003/0038735 | A1 | * | 2/2003 | Blumberg | 341/22 |
| 2003/0046560 | A1 |   | 3/2003 | Inomata et al. | |
| 2003/0081247 | A1 |   | 5/2003 | Sharma | |
| 2003/0145218 | A1 |   | 7/2003 | Hutchison | |
| 2003/0231767 | A1 |   | 12/2003 | Carbajal | |

(Continued)

FOREIGN PATENT DOCUMENTS

| JP | 63-212275 | 5/1988 |
|---|---|---|
| JP | 63-212276 | 5/1988 |

OTHER PUBLICATIONS

"Confidential, a.". The Oxford English Dictionary. 2nd ed. 1989. OED Online. Oxford University Press. Available at dictionary.oed.com. Downloaded Sep. 15, 2009.*

(Continued)

*Primary Examiner* — Michael S McNally
(74) *Attorney, Agent, or Firm* — SoCal IP Law Group LLP; Steven C. Sereboff; Jonathan Pearce

(57) ABSTRACT

The present invention is directed to a system and method for secure document transmission. A sender selects a portion of an original document containing confidential information using a highlighter, bracketing, underlining, or other identifying marks. The original document is then scanned to generate an electronic version, which is subject to optical character recognition to locate the portions of the document containing confidential information based on the identifying marks. These portions containing confidential information are then encrypted and a hybrid document containing non-encrypted portions and encrypted portions is generated. The hybrid document is then sent to a recipient, along with a decryption key. The hybrid document is then marked by the recipient to designate those areas containing encrypted information. The marked document is then scanned to generate an electronic version, which is analyzed to identify which portions require decryption based on the identifying marks made by the recipient. These portions are decrypted and a complete reproduction of the original document is generated for the recipient.

12 Claims, 3 Drawing Sheets

U.S. PATENT DOCUMENTS

2004/0165211 A1    8/2004    Herrmann et al.
2004/0193871 A1    9/2004    Seshadri
2005/0094178 A1    5/2005    Anno
2005/0141010 A1    6/2005    Kanai

OTHER PUBLICATIONS

Japan Patent Office, Notification of Reasons for Refusal for Application No. 2006-264797, Mail Date Mar. 29, 2011.

* cited by examiner

SYSTEM AND METHOD FOR ENCRYPTING AND DECRYPTING DOCUMENT REPRODUCTIONS

BACKGROUND OF THE INVENTION

This invention is directed to a method and system for secure document transmission. More particularly, this invention is directed to a method and system for encrypting a document at a sending document processing device, transmitting the document to a receiving document processing device, and decrypting the document using the receiving document processing device.

In a conventional office setting, document processing devices, such as printers, copiers, facsimile machines and scanning devices typically include little to no inherent data security. Generally, document processing devices are left in an open area, easily accessible to users, with little regard for the security of documents output by the document processing device. For example, facsimile transmissions are ordinarily output as received, remaining in the document processing device's output tray for any passerby to view. This received document may contain client names, social security numbers, bank account numbers, credit card numbers, and the like, which the sender desires to remain confidential. Various attempts have been made to alleviate the security concerns for hardcopy outputs of document processing devices, however these features are dependent upon the receiver and do not take into account sender desires for confidentiality. For example, facsimile machines incorporate security features to protect access to received documents, i.e., storing the electronic form of the document until the input of a user identification and/or password. Such security features are rarely activated by the receiver, leaving little protection available to the sender.

The subject invention overcomes the aforementioned problems and provides a method and system for secure document transmission.

SUMMARY OF THE INVENTION

In accordance with the present invention, there is provided a system and method for secure document transmission.

Further in accordance with the present invention, there is provided a system and method for encrypting a document at a sending document processing device, transmitting the document to a receiving document processing device, and decrypting the document using the receiving document processing device.

Still further, in accordance with the present invention, there is provided a system and method for encrypting electronic document data for secure transmission to a document processing device, wherein the document processing device decrypts the electronic document data and outputs the electronic document in accordance with user provided instructions.

In accordance with the present invention, there is provided a system for secure document transmission. The system includes receiving means adapted to receive a document containing indicia representing at least one area of the document in which confidential information is located. The system also includes scanning means adapted to scan the document resulting in an electronic version of the document. In addition, the system includes encryption means adapted to encrypt the area containing confidential information into an encrypted portion, and generating means adapted to generate a hybrid electronic document including at least one non-encrypted portion and the at least one encrypted portion. Furthermore, the system includes communication means adapted to communicate the hybrid electronic document to a selected destination.

Further, in accordance with the present invention, there is provided a method for secure document transmission. The method begins with the receipt of a document containing indicia representing at least one area of the document containing confidential information. The document is then scanned to generate an electronic version. The at least one area containing confidential information is then encrypted, resulting in an encrypted portion. A hybrid electronic document is then generated containing at least one non-encrypted portion and the at least one encrypted portion. The hybrid electronic document is then transmitted to a selected destination.

Still other advantages, aspects and features of the present invention will become readily apparent to those skilled in the art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

The subject invention is described with reference to certain parts, and arrangements to parts, which are evidenced in conjunction with the associated drawings, which form a part hereof and not, for the purposes of limiting the same in which.

DETAILED DESCRIPTION OF THE PREFERRED EMBODIMENT

This invention is directed to a system and method for encrypting and decrypting image data using secure encryption/decryption keys. In particular, the present invention is directed to a system and method for encrypting and decrypting image data on a network using a secure method for generating keys and encryption/decryption management without direct user intervention. More particularly, the present invention is directed to a system and method for encrypting and decrypting electronic documents transmitted to or stored on a document processing device. In the preferred embodiment, as described herein, the document processing device is suitably an image generating device. Preferably, the image generating device is a multifunctional peripheral device, capable of providing scanning, copying, facsimile, printing, document management, document storage, electronic mail, and other functions to a user.

Figure 1:
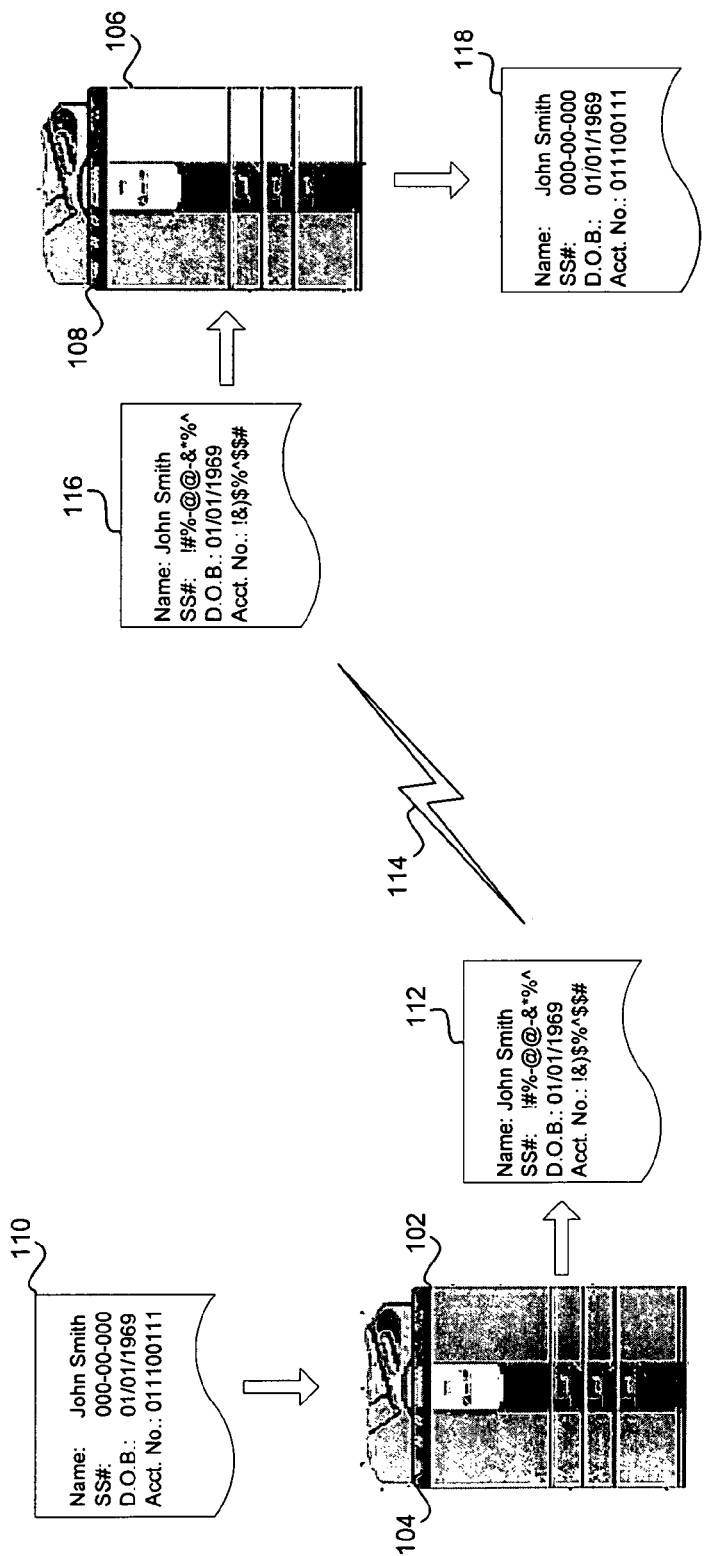
FIG. 1 is a block diagram illustrative of the system of the present invention.

Turning now to FIG. 1, there is shown a system 100 in accordance with the present invention. As shown in FIG. 1, the system 100 suitably includes a sender associated document processing device, illustrated in FIG. 1 as document processing device 102. It will be appreciated by those skilled in the art the document processing device 102 is advantageously represented in FIG. 1 as a multifunction peripheral device, suitably adapted to provide a variety of document processing services, such as, for example and without limitation, scanning, copying, facsimile, printing, and the like. Suitable commercially available image generating devices include, but are not limited to, the Toshiba e-Studio Series Controller. In a preferred embodiment of the present invention, the document processing device 102 includes a user-interface 104, enabling direct input of information to the document processing device 102. As will be appreciated by those skilled in the art, the user-interface 104 is any suitable input/output display device enabling receipt of the instructions and display of messages, including, for example and without limitation, a touchscreen display, an LCD display and corresponding alpha-numeric keypad, function-specific keypad and the like. In accordance with the present invention, the user-interface 104 is suitably adapted to receive user input in the form of a password, encryption key, smart card, and the like, so as to enable confidential and secure printing and transmission of image data. It will be appreciated by those skilled in the art that a document processing device is used for example purposes only, and the present invention is not limited solely to application to multifunction peripheral devices. For example, a photocopy machine and facsimile machine used together are equally capable of employing the subject invention in place of the document processing device 102, so as to enable secure transmission of image data and the like.

The system 100 illustrated in FIG. 1 also includes a receiver associated document processing device 106, shown as a multifunction peripheral device. As previously stated, the document processing device 106 is preferably adapted to provide scanning, copying, facsimile, printing, and other document processing services. Suitable commercially available document processing devices include, but are not limited to, the Toshiba e-Studio Series Controller. In one embodiment of the present invention, the document processing device 106 includes an associated user-interface 108, suitably adapted to enable direct communication with a user. As will be understood by those skilled in the art, the user-interface 108 is any suitable input/output display device enabling receipt of the instructions and display of messages to an associated user, including, without limitation, a touchscreen display, an LCD display and corresponding alpha-numeric keypad, function-specific keypad, and the like. Preferably, the user-interface 106 is suitably adapted to receive user input, such as a user identification, password, decryption key, and the like. It will be appreciated by those skilled in the art that the inclusion of the associated user-interface enables the secure receipt and decryption of documents from a remote sender.

As shown in FIG. 1, the sending document processing device 102 and the receiving document processing device 106 are capable of sending and receiving electronic document data via a suitable communications link 114. It will be appreciated by those skilled in the art that the communications link 114 is any communications channel, known in the art, capable of transporting data communications between electronic devices. Suitable communications links include, but are not limited to, the public-switched telephone system, the Internet, local area networks, wide area networks, personal area networks, WiMax, and the like.

The system 100 illustrated in FIG. 1 includes an original document 110 that is encrypted by the sending document processing device 102 to generate an encrypted electronic document 112. It will be appreciated by those skilled in the art that the original document 110 is any suitable document, including hardcopy and electronic document data, or any combination thereof. In accordance with the present invention, the original document is input into the document processing device 102 via any means known in the art. In the preferred embodiment, the original document is a hardcopy, which a sender desires to securely transmit to a receiver, via the communications link 114. It will be understood by those skilled in the art that such a transmission is capable of comprising, but is not limited to, an electronic data transmission, such as an electronic mail message, a facsimile transmission, and the like. Preferably, the sender selects a secure facsimile transmission of the original document.

In accordance with the present invention, the original document 110 is input into the document processing device 102 for encryption of certain portions of the document 110. Preferably, the portions of the document 110 that the user desires to have encrypted are marked by the user in advance of inputting the document 110 into the document processing device 102. In the preferred embodiment, a user marks the selected portion of the document 110 to be encrypted by highlighting the selected portions with a predetermined color, such as, for example and without limitation, red, yellow, blue, and the like. As will be understood by those skilled in the art, suitable highlighting methods include, but are not limited to, markers, word processing options, and the like. The highlighted original document 110 is then scanned by the document processing device 102, one page at a time. When the user selects the option to encrypt portions of the document 110, the user is prompted to input or select an encryption key via the associated user-interface 104. The document processing device 102 then scans the original document 110 and generates image data corresponding to a page of the document 110.

Each electronic page of the document 110 is then subjected to optical character recognition, whereby the document processing device 102 searches for highlighted portions of the document 110. As highlighted portions are discovered, they are encrypted by the document processing device 102 using the input/selected encryption key. The rendered, partially encrypted, pages are then output in hardcopy form for facsimile transmission, or alternatively, are rendered into an electronic format for transmission via electronic mail, or the like. The partially encrypted document is illustrated in FIG. 1 as the encrypted document 112. A decryption key is then suitably displayed, output, or otherwise provided to the user by the document processing device 102 for subsequent transmission to a destination selected by the user.

The encrypted document 112 is then transmitted from the document processing device 102 to the document processing device 106, via the communications link 114. In accordance with a preferred embodiment of the present invention, the transmission is a facsimile transmission, resulting in the output of a facsimile encrypted document 116 at the receiving user's location. It will be appreciated by those skilled in the art that the facsimile encrypted document 116 is capable of being output by a facsimile machine (not shown), or by the document processing device 106. In this embodiment, the facsimile encrypted document 116 is in hardcopy form, suitably capable of being further processed by the document processing device 106.

The receiver, upon receipt of the facsimile encrypted document 116 and the decryption key, preferably communicated to the receiver from the sender via a separate transmission, are used to decrypt the encrypted document 116. In accordance with the present invention, and continuing the facsimile transmission of the preferred embodiment, the receiving user selects portions of the document 116 for decryption prior to inputting the document into the document processing device 106. As previously discussed above, receiving user selection of a portion of the document to decrypt mirrors sending user selection of a portion of the document to encrypt. Thus, the receiving user highlights or otherwise identifies those encrypted portions of the facsimile document 116 to decrypt. The user then selects a decryption document processing operation to be performed by the document processing device 106 via the associated user-interface 108. The receiving user then inputs the decryption key, received from the sending user, via the associated user-interface 108. The facsimiled document 116 is then scanned, one page at a time, to generate image data. For each page of the document 116, the image data is searched, preferably using optical character recognition, for portions that have been selected by the receiving user for decryption. Thus, the optical character recognition software residing on the document processing device 106 advantageously recognizes those highlighted portions of the page being analyzed. The encrypted portions are then decrypted by the document processing device 106 using the decryption key associated therewith. Each page is then rendered and output, resulting in a reproduction 118 of the original document 110.

Figure 2:
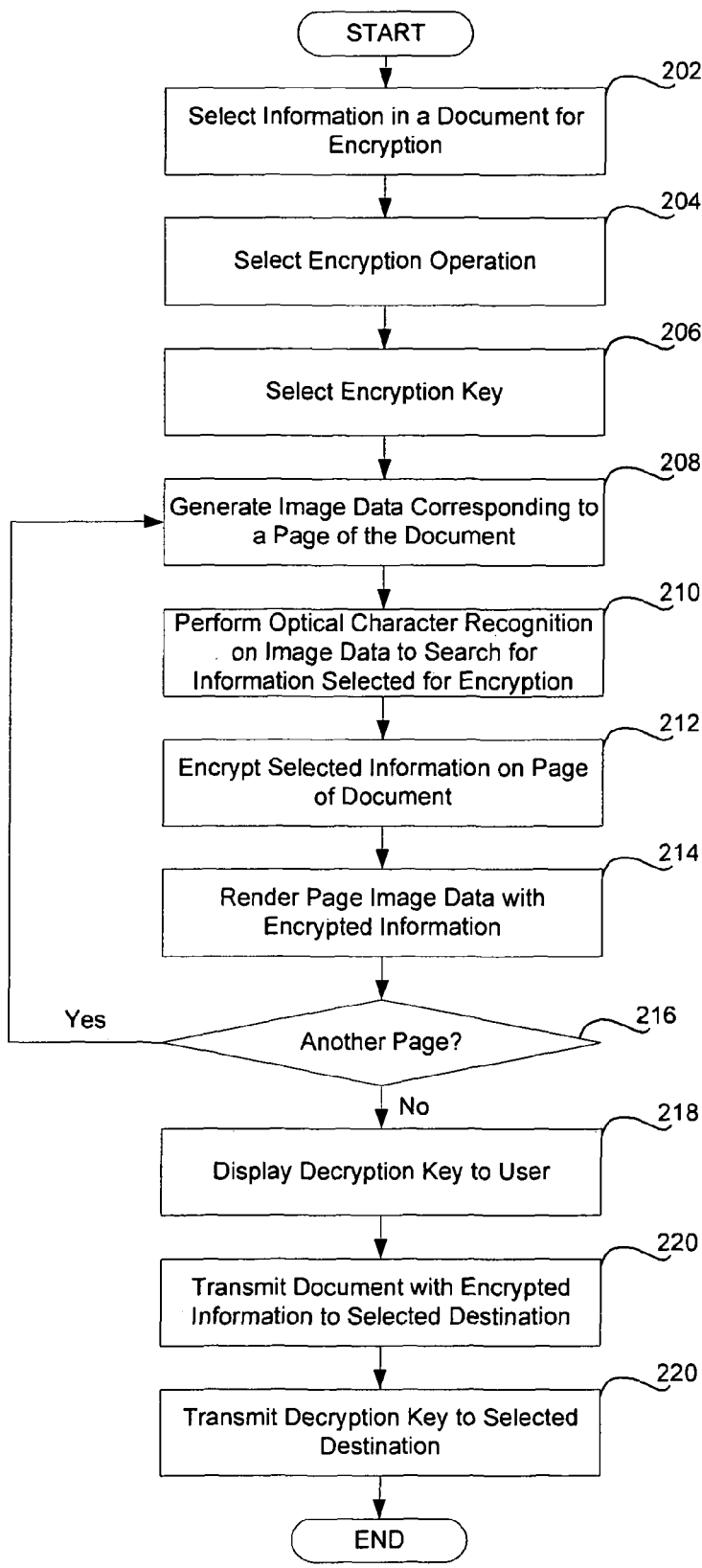
FIG. 2 is a flowchart illustrating an encryption process in accordance with the present invention.

Turning now to FIG. 2, there is shown a flowchart 200 illustrating the encryption of a portion of the original document 110 in accordance with the present invention. As shown in FIG. 2, the method begins at step 202, wherein the sender selects a portion of the original document 110 containing confidential information for encryption. Preferably, the original document 110 is a hardcopy of a document and the selection requires the sender to highlight, underline, bracket, or otherwise denote a portion of the document 110 for encryption. It will be understood by those skilled in the art that highlighting of the selected portion of the document 110 is suitably accomplished using a predetermined color, such as for example and without limitation, red, blue, yellow, and the like. At step 204, the sender suitably selects the desired encryption operation on the sending document processing device 102. Preferably, the sender selects the desired operation via the associated user-interface 104. At step 206, the sender selects an encryption key for use by the document processing device 102 in the encryption of the selected portions of the document 110. It will be appreciated by those skilled in the art that suitable encryptions keys are capable of being randomly generated by the document processing device, selected from a predetermined list of user-associated encryption keys, input by the sender during the encryption processing, or the like.

The document processing device 102 then scans the original document 110 at step 208 so as to generate image data corresponding to a page of the original document 110. The page image data is then sent to an optical character recognition component associated with the document processing device 102 at step 210, for performance thereon. During the optical character recognition step of the preferred embodiment, the document processing device 102 suitably searches the page image data for portions selected for encryption, i.e., by recognizing the highlighted, bracketed, underlined, or otherwise denoted portions for encryption. The selected portions are then encrypted using the encryption key at step 212. The page image data containing the encrypted portion is then rendered by the document processing device 102 at step 214, resulting in the partially encrypted document 112. In the preferred embodiment, the method of transmission is facsimile transmission, thus the rendering suitably entails the output of a hardcopy form of the encrypted page.

Following rendering of the page image data containing an encrypted portion, a determination is made at step 216 whether an additional page is present in the document 110. When additional pages are present, flow returns to step 208, wherein image data is generated for each page, via scanning, and optical character recognition and encryption follows. It will be understood by those skilled in the art that when no portions of a page of the document are selected for encryption, the page is simply rendered and included with those pages containing encrypted data. When no additional pages remain in the document 110 for processing, flow proceeds to step 218, wherein a decryption key associated with the partially encrypted document 112 is displayed, output, or otherwise communicated to the sender.

The partially encrypted document 112 is then ready for transmission to a selected destination. It will be understood by those skilled in the art that the selected destination is preferably a destination to which the sender desires certain portions of the original document 110 to remain confidential until the intended recipient views the document, thereby avoiding the misappropriation of confidential information resident in the original document 110. Therefore, at step 220 the partially encrypted document 112 is transmitted to the receiver via the communications link 114. As discussed above, the communications link 114 in the preferred embodiment is a facsimile capable link. At step 222, the sender transmits to the selected destination the decryption key. Preferably, the decryption key is communicated directly to the intended recipient at the selected destination, such as via electronic mail, telephone call, or a subsequent facsimile transmission. The decryption by the intended recipient will now be explained with reference to FIG. 3.

Figure 3:
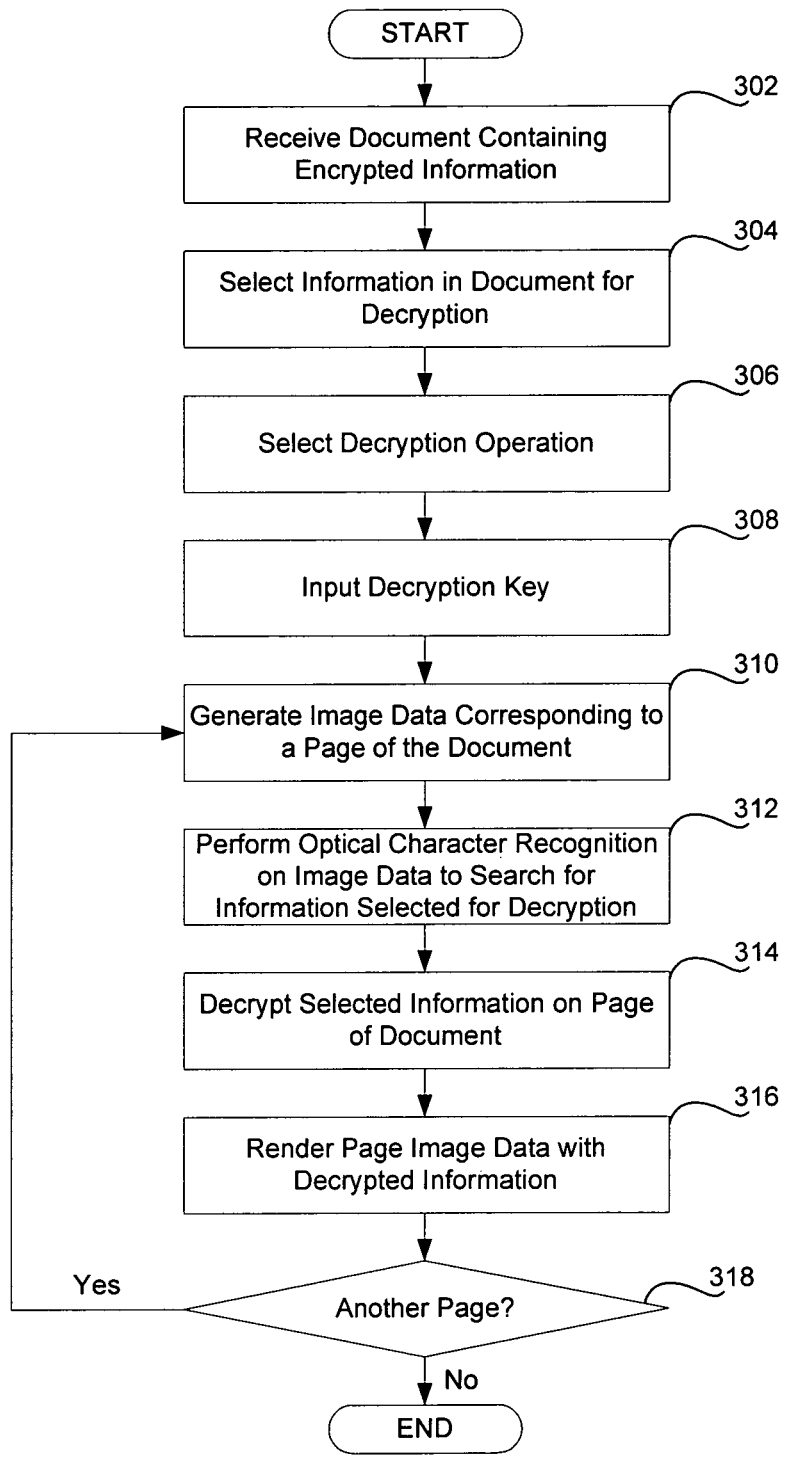
FIG. 3 is a flowchart illustrating a decryption process in accordance with the present invention.

Referring now to FIG. 3, there is shown a flowchart 300 illustrating the decryption of a document in accordance with the present invention. The intended recipient, or receiver, receives the partially encrypted facsimile document 116 and the necessary decryption key at step 302. At step 304, the recipient selects those portions of the document 116 requiring decryption. Similar to the manner in which the sender selected portions of the original document 110 for encryption, the recipient highlights, brackets, underlining, or otherwise identifies the encrypted portions of the document 116. The recipient then selects via the associated user-interface 108, a decryption operation on the document processing device 106 for performance upon the partially encrypted facsimile document 116 at step 306. At step 308, the user inputs via the associated user-interface 108 the decryption key received from the sender. The document 116 is then input into the document processing device 106 for decryption.

The document processing device 106 then scans the document 116 so as to generate electronic image data at step 310 corresponding to each page of the scanned document 116. The page image data is then forwarded to an optical character recognition component associated with the document processing device 106. Optical character recognition is then performed on the page image data at step 312 to search for portions of the document 116 selected by the recipient as requiring decryption. The selected portions of the document 116 discovered during optical character recognition are then decrypted at step 314 by the document processing device 106. The decrypted page is then rendered at step 316, so as to generate a reproduction document 118 of the original document 110. A determination is then made at step 318 whether additional pages remain to be decrypted. When additional pages remain, flow returns to step 310, wherein the next page of the partially encrypted facsimile document 116 is scanned and processed in accordance with steps 312-316, discussed above. When no additional pages remain, the process terminates and the recipient has a reproduction 118 of the original document 110, while the sender has maintained the confidentiality of certain portions of the document until viewed by the intended recipient.

The invention extends to computer programs in the form of source code, object code, code intermediate sources and object code (such as in a partially compiled form), or in any other form suitable for use in the implementation of the invention. Computer programs are suitably standalone applications, software components, scripts or plug-ins to other applications. Computer programs embedding the invention are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the invention principles as described, will fall within the scope of the invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A method for secure document transmission comprising:
   receiving a tangible document, the tangible document including humanly added indicia representative of an area in which confidential information is located;
   scanning the tangible document to generate an electronic document;
   encrypting the area to thereby generate an encrypted portion;
   generating a hybrid electronic document inclusive of a non-encrypted portion of the electronic document and the encrypted portion;
   communicating the hybrid electronic document to a selected destination;
   receiving the hybrid electronic document;
   receiving a humanly added annotation identifying the encrypted portion in the hybrid electronic document;
   detecting the humanly added annotation to thereby identify the encrypted portion; and
   decrypting the encrypted portion of the hybrid electronic document.

2. The method for secure document transmission of claim 1, further comprising:
   associating the encrypted portion with an encryption key; and
   selectively communicating the encryption key to the selected destination to enable decryption of the hybrid electronic document.

3. The method for secure document transmission of claim 2, wherein the step of communicating the hybrid electronic document to a selected destination further comprises:
   rendering the hybrid electronic document so as to output the hybrid electronic document as a hardcopy document;
   scanning the hardcopy document to generate facsimile data representative of the hybrid electronic document; and
   transmitting the facsimile data to the selected destination.

4. The method for secure document transmission of claim 3, further comprising:
   receiving the facsimile data; and
   rendering a rendered hardcopy document of the facsimile data.

5. The method for secure document transmission of claim 1, wherein receiving the humanly added annotation further comprises scanning the rendered hardcopy including the humanly added annotation so as to generate a hybrid electronic document inclusive of the non-encrypted portion and the encrypted portion.

6. The method for secure document transmission of claim 1, wherein the humanly added annotation is at least one of the group consisting of highlighting, bracketing, and underlining.

7. A computer-readable, tangible, and non-transitory data storage medium with computer-readable instructions stored thereon for secure document transmission comprising:
   instructions for receiving a tangible document, the tangible document including humanly added indicia representative of an area on the tangible document in which confidential information is located;
   instructions for scanning the tangible document to generate an electronic document;
   instructions for encrypting the area to thereby generate an encrypted portion;
   instructions for generating a hybrid electronic document inclusive of a non-encrypted portion of the electronic document and the encrypted portion;
   instructions for communicating the hybrid electronic document to a selected destination;
   instructions for receiving the hybrid electronic document;
   instructions for receiving the humanly added annotation identifying the encrypted portion in the hybrid electronic document;
   instructions for detecting the humanly added annotation to thereby identify the encrypted portion; and
   instructions for decrypting the encrypted portion of the hybrid electronic document.

8. The computer-readable medium of instructions with computer-readable instructions stored thereon for secure document transmission of claim 7, further comprising:
   instructions for associating the encrypted portion with an encryption key; and
   instructions for selectively communicating the encryption key to the selected destination to enable decryption of the hybrid electronic document.

9. The computer-readable medium of instructions with computer-readable instructions stored thereon for secure document transmission of claim 8, wherein the instructions for communicating the hybrid electronic document to a selected destination further comprises:
   instructions for rendering the hybrid electronic document so as to output the hybrid electronic document as a hardcopy document;
   instructions for scanning the hardcopy document to generate facsimile data representative of the hybrid electronic document; and
   instructions for transmitting the facsimile data to the selected destination.

10. The computer-readable medium of instructions with computer-readable instructions stored thereon for secure document transmission of claim 9, further comprising:

instructions for receiving the facsimile data; and instructions for rendering a rendered hardcopy document of the facsimile data.

11. The computer-readable medium of instructions with computer-readable instructions stored thereon for secure document transmission of claim 7, wherein the instructions for receiving the humanly added annotation comprises:

instructions for scanning the rendered hardcopy including the humanly added annotation so as to generate a hybrid electronic document inclusive of the non-encrypted portion and the encrypted portion.

12. The computer-readable medium of instructions with computer-readable instructions stored thereon for secure document transmission of claim 7, wherein the humanly added annotation is at least one of the group consisting of highlighting, bracketing, and underlining.

\* \* \* \* \*